United States Patent
Przybysz et al.

(10) Patent No.: US 9,789,839 B2
(45) Date of Patent: Oct. 17, 2017

(54) AIRBAG MODULE WITH AN AIRBAG ENVELOPE ASSEMBLY OPENING

(71) Applicant: Autoliv Development AB, Vårgårda (SE)

(72) Inventors: Lukasz Przybysz, Wroclaw (PL); Laurent Hellot, La Feuillie (FR); Jakub Czeczot, Wroclaw (PL); Laurent Broggini, St Samson la poterie (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/126,175

(22) PCT Filed: Mar. 16, 2015

(86) PCT No.: PCT/EP2015/055420
§ 371 (c)(1),
(2) Date: Sep. 14, 2016

(87) PCT Pub. No.: WO2015/140098
PCT Pub. Date: Sep. 24, 2015

(65) Prior Publication Data
US 2017/0080890 A1 Mar. 23, 2017

(30) Foreign Application Priority Data
Mar. 19, 2014 (DE) .......... 10 2014 103 756

(51) Int. Cl.
*B60R 21/16* (2006.01)
*B60R 21/217* (2011.01)
(Continued)

(52) U.S. Cl.
CPC .......... *B60R 21/217* (2013.01); *B60R 21/201* (2013.01); *B60R 21/235* (2013.01);
(Continued)

(58) Field of Classification Search
CPC .............. B60R 21/233; B60R 21/2346; B60R 21/2338; B60R 2021/23382
(Continued)

(56) References Cited

U.S. PATENT DOCUMENTS 5,573,270 A * 11/1996 Sogi ...................... B60R 21/233
280/740
5,580,080 A * 12/1996 Soderquist ............ B60R 21/217
280/728.2

(Continued)

FOREIGN PATENT DOCUMENTS

DE 10 2009 046 841 A1 5/2010
EP 1 508 487 B1 8/2003
(Continued)

OTHER PUBLICATIONS

German Examination Report—Dec. 4, 2014.
PCT International Search Report—May 15, 2015.

*Primary Examiner* — Toan To
(74) *Attorney, Agent, or Firm* — Brinks Gilson & Lione

(57) ABSTRACT

An airbag module having an airbag casing and at least one installation opening (1) formed in the airbag casing for guiding in at least one part of a gas generator. The airbag casing has at least two layers (2) regionally lying one another, in which differently-oriented incisions are provided that together form the installation opening (1). The layers (2) lying over one another forming the installation opening (1) are connected to one another by at least one seam (5). The region (4) of the airbag casing forming the installation openings (1) is separated from the rest of the airbag casing by the seam. The incisions in each layer (2) each form a longitudinal recess (3) forming a combined shape with an outer circumferential line in their projection viewed over all layers (2) and the seam duplicates the circumferential line of the combined shape.

10 Claims, 3 Drawing Sheets

(51) Int. Cl.
*B60R 21/235* (2006.01)
*B60R 21/201* (2011.01)

(52) U.S. Cl.
CPC ............... *B60R 2021/23509* (2013.01); *B60R 2021/23576* (2013.01); *B60Y 2306/01* (2013.01)

(58) Field of Classification Search
USPC .......................................... 280/743.1, 743.2
See application file for complete search history.

(56) References Cited

U.S. PATENT DOCUMENTS

| | | | |
|---|---|---|---|
| 6,145,872 A | 11/2000 | Soderquist et al. | |
| 8,382,154 B2* | 2/2013 | Suzuki | B60R 21/239 280/739 |
| 8,684,409 B2* | 4/2014 | Wiaderny | B60R 21/2338 280/743.2 |
| 8,764,056 B2* | 7/2014 | Wipasuramonton | B60R 21/26 280/729 |
| 8,840,139 B1* | 9/2014 | Borton | B60R 21/2338 280/740 |
| 2014/0117650 A1* | 5/2014 | Glaab | B60R 21/231 280/729 |
| 2016/0090059 A1* | 3/2016 | Tanaka | B60R 21/235 280/743.1 |
| 2016/0152207 A1* | 6/2016 | Jahme | B60R 21/2338 280/743.1 |

FOREIGN PATENT DOCUMENTS

| | | |
|---|---|---|
| FR | 2 827 521 | 12/2003 |
| JP | 2002225664 A | 8/2002 |

\* cited by examiner

US 9,789,839 B2

AIRBAG MODULE WITH AN AIRBAG ENVELOPE ASSEMBLY OPENING

CROSS REFERENCE TO RELATED APPLICATIONS

This application claims priority to German Patent Application No. 10 2014 103 756.1, filed on Mar. 19, 2014 and PCT/EP2015/055420, filed on Mar. 16, 2015.

FIELD OF THE INVENTION

The present invention relates to an airbag module with at least one airbag that having an airbag casing and at least one installation opening formed in the airbag casing for receiving at least one part of a gas generator. The airbag casing has at least two layers lying at least regionally one over the other. Differentially oriented incisions are provided that together form the installation opening, and wherein the layers lying one over the other of a region of the airbag casing forming the installation opening are connected to one another by an attachment, in particular a seam, so that the region of the airbag casing forming the installation opening is completely separated from the rest of the airbag casing by the attachment means.

BACKGROUND

One airbag module of the above-described general type is known from EP 1 508 487 B1, wherein the incisions in the layers lying one over the other are formed by a slit in each layer. During the introduction of the gas generator in the airbag, the slits are widened, wherein in the installation position only the attachment sections of the gas generator protrude through the installation openings.

In airbag modules in which, in the installation position, a circular section of a gas generator remains in the installation opening, strains are induced in the airbag casing by the slit widened by the gas generator, which strains prevent tight sealing of the installation opening in case of actuation and thus lead to leakage of inflation gas in the region of the installation opening.

The object of the present invention is therefore to at least partially solve the problems outlined with respect to the prior art and in particular to provide an airbag module in which the leakage rate is reduced.

SUMMARY

These above objects are achieved by an airbag having the features described and claimed herein.

The objects are achieved in particular in that the incisions in each layer each form a longitudinal recess, wherein the longitudinal recesses form a combined shape with an outer circumferential line in their total projection viewed over all layers, and the course of the attachment duplicates the circumferential line of the combined shape.

The airbag module thus includes an airbag casing formed at least sectionally from a plurality of layers, in which an installation opening is formed by incisions in the layers, incisions which are oriented in at least two directions, wherein the region forming the incisions is completely surrounded in particular by a seam that connects the layers lying one over the other to one another.

The present invention now provides that a recess is formed in each layer, which means that with a flatly spread-out layer, there is no region in the layer forming the recess. The recess thus represents a flat region. In particular a region forming the recess is cut out of a fabric forming the layer. Furthermore the shape of each recess extends in one direction over a greater length than a direction orthogonal thereto, wherein the longer direction can be understood as the longitudinal axis of the recess.

The projections of the recesses of each layer in exactly one direction, in particular orthogonally to the airbag casing surface, represent a total projection, wherein the edge of the total projection forms a combined shape whose outer circumference represents the outer circumferential line of the combined shape. With two rectangular recesses that cross orthogonally with their longitudinal axes the total projection represents a cross, for example.

The course of the attachment, in particular a seam, also has a shape similar to that of the circumferential line of the combined shape. This means, for example, that the course of the attachment at the corresponding location has at least the same direction of curvature as the circumferential line of the combined shape. The attachment thus represents an envelope curve of the circumferential line of the combined shape. If the total projection of the combined shape has a cross shape, for example, then the course of the attachment also represents a cross.

With regard to the airbag casing formed of a plurality of layers, its arrangement, connection, and function, reference is made to the above-mentioned EP 1 508 487.

The gas generator preferably has a circular cross-section and in the installed position is disposed in the installation opening. Due to the recesses, an installation opening is formed in the overlapping region of the recesses, in which the installation opening, in particular in its dimensions, is slightly smaller than a circumference of a gas generator to be installed, so that during the installation of the gas generator, and also in the installed location, the installation opening is only slightly widened. This results in only a slight introduction of strain in the airbag casing. Thus the escape of inflation gas introduced in the airbag is reduced.

The invention thus has the advantage of a reduced inflation gas leakage rate.

Another special effect of the present invention is that due to the differently-oriented alignment of the recesses, during the installation of the gas generator each recess is widened in a direction that a recess of an overlying layer has its longitudinal axis. The energy generating the strain in the airbag casing during inflating of the gas can thereby be absorbed particularly efficiently without resultant leakage of the gas.

According to one embodiment of the airbag module in accordance with the present invention, the recess has an ellipsoid shape. The shape of the recess thus essentially corresponds to that of an ellipse. In particular the recess has exactly the shape of an ellipse. Due to such an embodiment of the recess shape, the installation opening formed from the overlapping of the elliptical recesses approximates a circular cross-section of the gas generator, whereby the inflation gas leakage rate can be further reduced.

According to a further embodiment of the airbag module in accordance with the present invention, a distance between the circumferential line of the combined shape and the attachment means is the same at all points. This means in particular that the shape of the course of the attachment corresponds to the shape of the circumferential line of the combined shape, wherein the shape of the course of the attachment represents an enlargement of the circumferential line of the combined shape. A particularly stable and thus tight installation opening is thereby achieved, so that a gas generator can be securely fixed in the installation opening.

According to a further embodiment of the present invention, it is provided that a distance between the circumferential line of the combined shape and the attachment is no greater than 2 cm (centimeters) at any point, in particular no greater than 1 cm. The distance between the circumferential line of the combined shape and the attachment is preferably 0.5 cm to 0.8 cm.

In this context it is provided in particular than the course of the attachment has at least two changes in direction of curvature, which in particular ensures that the course of the attachment does not form a circle. According to the present invention a circular course of the attachment is not provided.

It can further be provided that the longitudinal openings of layers lying one over the other are disposed crosswise with respect to one another. In particular longitudinal axes of the longitudinal openings here can enclose an angle between 70 degrees and 110 degrees, preferably an angle of 90 degrees.

In order for the installation opening formed by the overlaps of the openings to more closely approximate a circular cross-section of a gas generator and thus to increase the gas tightness, it is provided that the longitudinal axes of the longitudinal openings of directly overlying layers intersect with an angle that results from a quotient of half the round angle (180°) and the number of layers. This embodiment is connected in particular to an ellipsoid shape of the openings. Thus, for example, the longitudinal axes of recesses formed in three layers intersect with an angle of 60°.

In a further embodiment the gas generator in accordance with the present invention is oriented with its longitudinal extension in the interior of the airbag oblique to the longitudinal axes of all longitudinal recesses. For this purpose the gas generator is introduced in the airbag through a further opening initially present in the airbag and then partially pushed outward from the interior of the airbag through the installation opening, with a region forming a terminal socket for an electrical contact. One part of the gas generator is thus disposed in the interior of the airbag and the other part outside the gas generator, while the edges of the installation opening abut the gas generator. In the installed state, the gas generator is then oriented obliquely in its longitudinal extension, in particular in the plane of the installation opening, i.e., not parallel to the longitudinal axes of all longitudinal recesses. It is thereby achieved that the part of the gas generator located in the interior of the airbag rests on all layers, at least in the installed state. In the region of the installation opening the gas generator on the other hand abuts at least sectionally only individual layers so that the installation opening matches the contour of the gas generator well, whereby the leakage rate can be further minimized.

In this context it is provided in particular that the gas generator is oriented with its longitudinal extension such that it intersects the longitudinal axes of the recesses of layers lying one over the other with approximately half the angle with which the longitudinal axes of the recesses of the layers lying one over the other intersect. Due to the symmetric arrangement of the longitudinal extension with respect to the longitudinal axes, optimal matching of the installation opening to the gas generator is achieved and the leakage rate is minimized still further.

BRIEF DESCRIPTION OF THE DRAWINGS

The invention as well as the technical environment are explained below by example using the figures, wherein it is to be noted that the figures show advantageous embodiments of the invention, but the invention is not limited to these.

DETAILED DESCRIPTION

Figure 1:
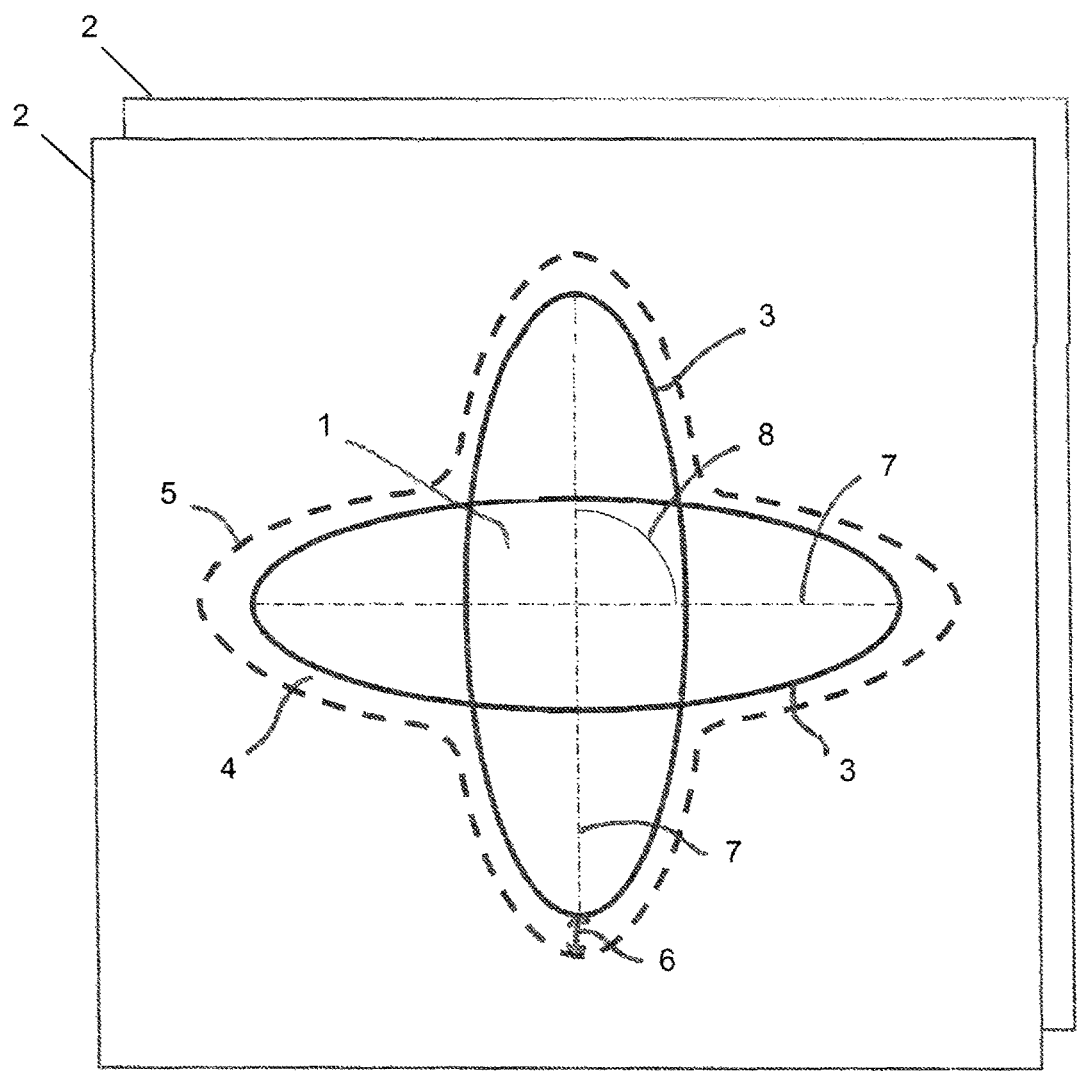
FIG. 1 schematically shows an airbag casing with two layers.

In the figures a region of an airbag casing of an airbag is depicted with a plurality of layers 2 lying one over the other. A recess 3 is formed in each of the layers 2 by cutting material from each layer 2. The recesses 3 have the shape of an ellipse or an ellipse-like oblong shape (described as a generally ellipse shape), wherein the ellipse shape is characterized by a longitudinal axis 7. The recesses 3 of the layers 2 laying one over the other are oriented differently with respect to one another so that the longitudinal axes 7 intersect at an angle 8. An installation opening 1 is formed by the overlap region of the recesses 3, in which installation opening 1 a gas generator 9 (shown diagrammatically in FIG. 3) with a circular cross-section is disposed in the installed state.

In a projection that extends orthogonally to the layers 2, the recesses 3 represent a general projection with a combined shape. The circumferential line of the combined shape here is formed by the respective outer boundary line of all recesses 3.

According to the present invention, the course of an attachment shown in the form of a seam 5 enclosing the recesses 3 recreates the circumferential line of the combined shape. A distance 6 between the seam 5 and the circumferential line of the combined shape of the recesses 3 is preferably at no point greater than 2 cm. The shape of the course of the seam 5 thus essentially corresponds to the shape of the circumferential line of the combined shape, while the shape of the course of the seam 5 is larger in area in comparison with the shape of the circumferential line.

In the embodiment depicted in FIG. 1, the airbag casing has two layers 2, wherein the elliptical recesses 3 formed in the layers 2 intersect with their longitudinal axes 7 at an angle 8 of 90 degrees.

Figure 2:
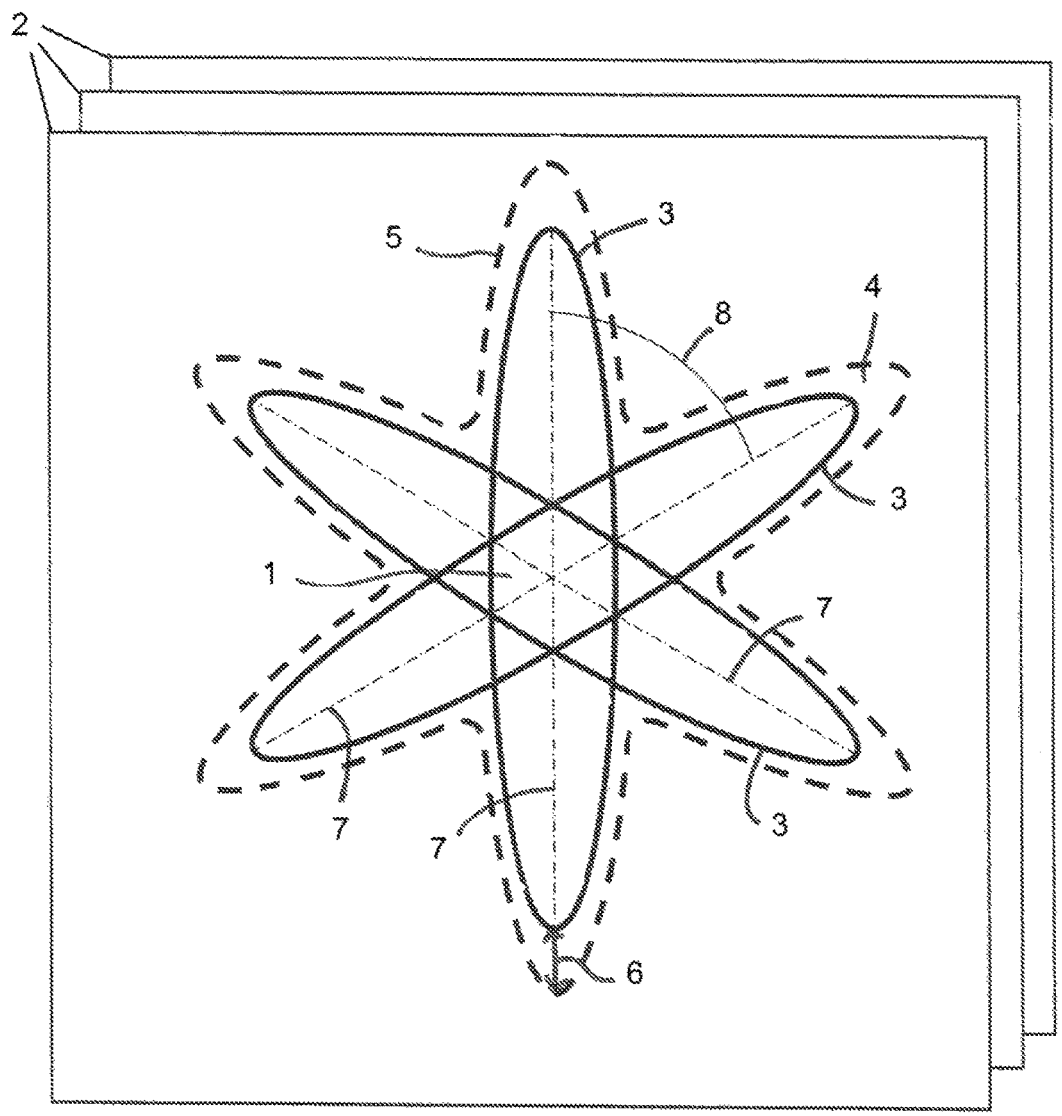
FIG. 2 schematically shows an airbag casing with three layers.

In contrast thereto, in the embodiment according to FIG. 2 generally elliptical opening 3 is formed in each of three layers 2, wherein openings 3 arranged one over the other respectively intersect with their longitudinal axes at an angle 8 of 60 degrees between layers.

Figure 3:
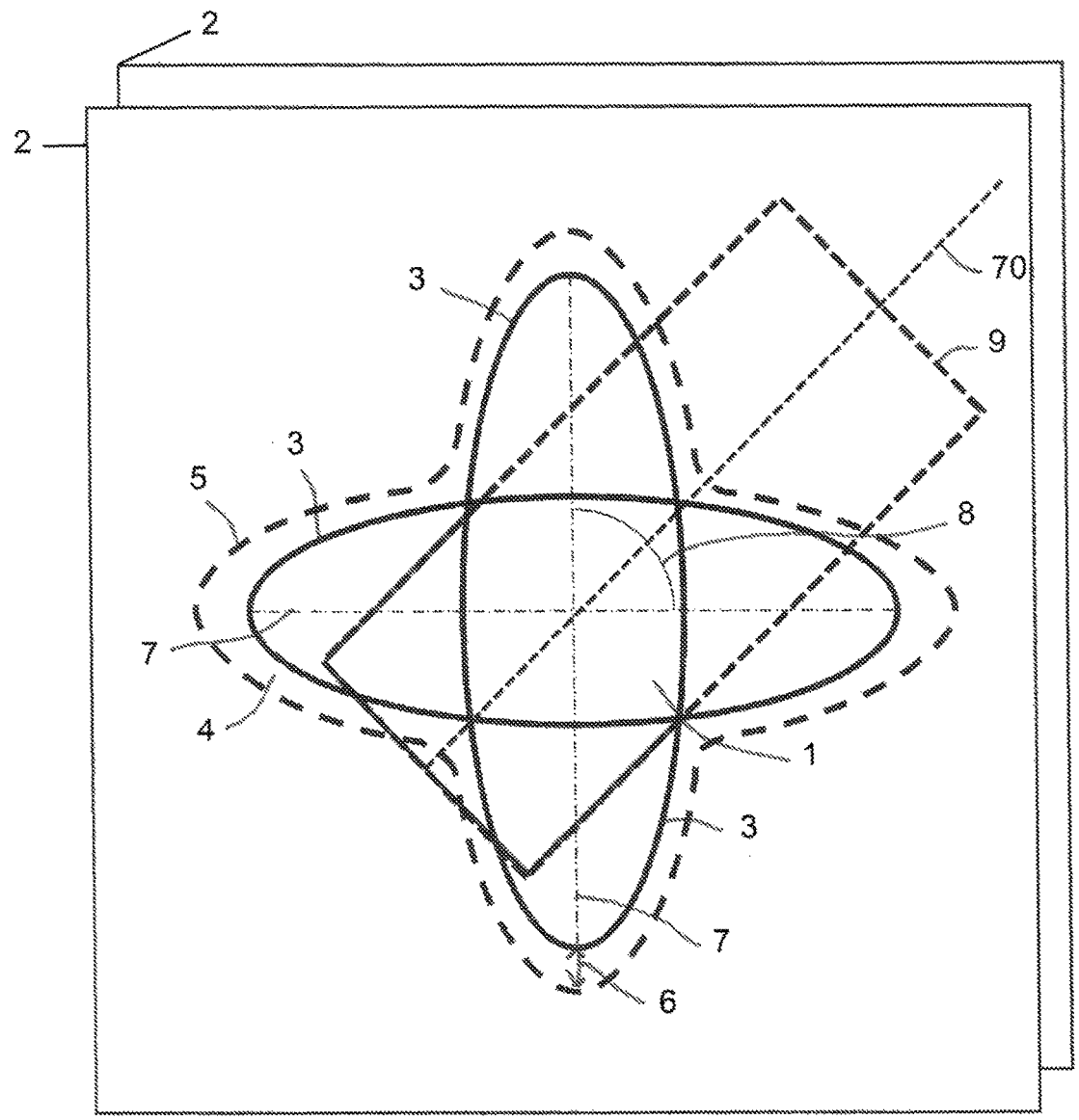
FIG. 3 schematically shows an airbag casing according to FIG. 1 with a gas generator.

FIG. 3 shows a region of an airbag as it is also depicted in FIG. 1. In the embodiment according to FIG. 3, a gas generator 9 with a longitudinal extension 10 is pushed into the installation opening 1. As is indicated by the dashed line, the part of the gas generator 9 arranged on the upper right is located inside the airbag, while the part of the gas generator 9 arranged on the lower left has been pushed outward through the installation opening 1 (solid line). A socket (not shown) for connecting a cable is located on the part of the gas generator 9 that is pushed outward.

Here the gas generator 9 is oriented such that in the direction of its longitudinal extension 10 divides the angle 8 between the longitudinal axes 7 of the two recesses 3 approximately in half. This ensures that the layers 2 abutting the gas generator 9 in the region of the installation opening 1 are partially only in a single layer and can adapt well to the contour of the gas generator 9, whereby the leakage of inflation gas is reduced. The part of the gas generator 9 disposed in the interior of the airbag rests at least sectionally on both layers 2.

An advantage associated with the present invention is that based on the installation opening 1 formed in the overlap region of the longitudinal openings 3, in which installation opening 1 a gas generator 9 can be installed in the fabric forming the layers 2, the gas leakage rate is reduced in case of actuation of the gas generator 9.

While the above description constitutes the preferred embodiment of the present invention, it will be appreciated that the invention is susceptible to modification, variation and change without departing from the proper scope and fair meaning of the accompanying claims.

The invention claimed is:

1. An airbag module with at least one airbag and a gas generator, comprising an airbag casing and at least one installation opening formed in the airbag casing for receiving at least one part of the gas generator, wherein the airbag casing has at least two layers at least regionally lying one over the other, wherein differently oriented incisions are provided that together form the installation opening, and wherein the layers lying one over the other of a region of the airbag casing forming the installation opening are connected to one another by at least one attachment so that the region of the airbag casing forming the installation opening is completely separated from the rest of the airbag casing by the attachment, the incisions in each layer each form a longitudinal recess, wherein the recesses form a combined shape with an outer circumferential line in their projection viewed over all layers and the course of the attachment duplicates the circumferential line of the combined shape.

2. The airbag module according to claim 1, wherein each recess has a generally elliptical shape.

3. The airbag module according to claim 1, further comprising wherein a distance between the circumferential line of the combined shape and the attachment is the same at all points.

4. The airbag module according to claim 1, further comprising wherein a distance between the circumferential line of the combined shape and the attachment is no greater than about 2 cm at any point.

5. The airbag module according claim 1 further comprising, wherein the course of the attachment has at least two changes in direction of curvature.

6. The airbag module according to claim 1 further comprising wherein the longitudinal recesses of layers lying one over the other are disposed crosswise to each other.

7. The airbag module according to claim 1 further comprising wherein longitudinal axes of the longitudinal recesses of layers lying one over the other intersect at an angle that results from a quotient of half the round angle and the number of layers.

8. The airbag according to claim 1 further comprising wherein the gas generator is oriented with its longitudinal extension obliquely to the longitudinal axes of all longitudinal recesses.

9. The airbag module according to claim 8, further comprising wherein the gas generator is oriented with its longitudinal extension such that it intersects the longitudinal axes of the recesses of layers at approximately half the angle at which the longitudinal axes of the recesses intersect the layers lying one over the other.

10. The airbag module according to claim 8, further comprising wherein the attachment is in the form of a seam.

* * * * *